May 17, 1932. G. O. ELLSTROM 1,858,768
CHARGING TRANSFER TABLE
Filed July 8, 1929    2 Sheets-Sheet 1

Inventor
George O. Ellstrom
by Cushman Bryant & Darby
Attorneys

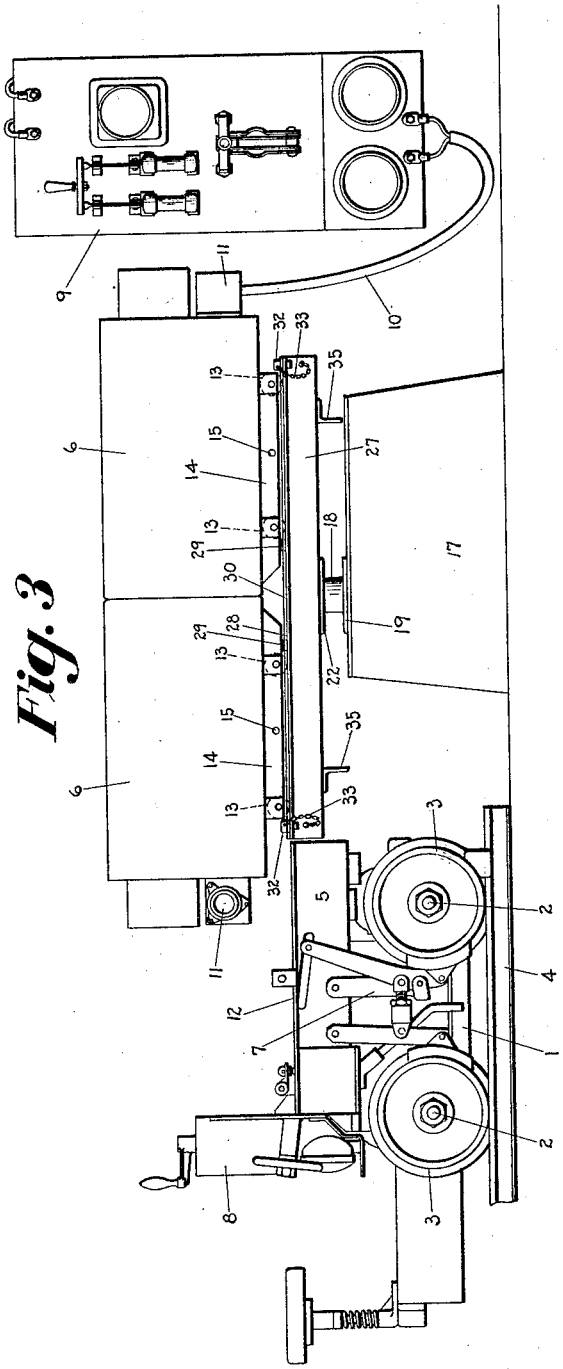

Patented May 17, 1932

1,858,768

UNITED STATES PATENT OFFICE

GEORGE O. ELLSTROM, OF UNIVERSITY CITY, MISSOURI, ASSIGNOR TO THE JEFFREY MANUFACTURING COMPANY, OF COLUMBUS, OHIO, A CORPORATION OF OHIO

CHARGING TRANSFER TABLE

Application filed July 8, 1929. Serial No. 376,657.

This invention relates to a charging transfer table and system of handling battery units.

An important object of the invention is to provide a simple and efficient manner of replacing discharged storage battery units of electric locomotives with charged units, and for transferring such units to a battery charging instrumentality in proper position to be connected therewith, where they remain during the charging interval, after which they are returned to the locomotive in proper position to be transferred thereon and connected thereto.

Other objects and advantages of the invention will become apparent during the course of the following description.

In the accompanying drawings forming a part of the application and wherein like numerals are employed to designate like parts throughout the several views.

Figure 3 is a side elevation of the entire apparatus showing a battery unit in position for receiving a charge and another battery unit which has just been transferred from the locomotive to the transfer table.

Figure 6 is a plan of the transfer and charging table, and

Figure 2:
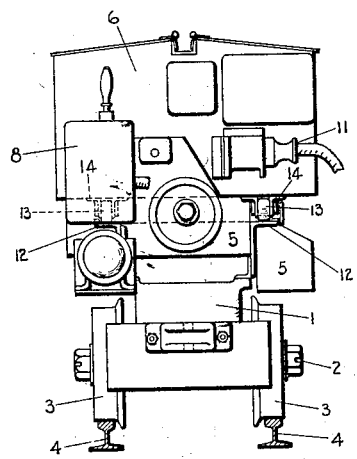
Figure 2 is an end elevation of the same.

Referring now more particularly to the drawings, the electric locomotive is substantially of standard construction and comprises a main frame 1 mounted upon axles 2, which carry wheels 3 for transportation along a track 4. A supplemental frame 5 is adapted to carry a battery unit 6 of well known construction which supplies the actuating current for the locomotive motors. A brake mechanism indicated in its entirety by the numeral 7 and an electrical controlling apparatus 8, control the movements of the locomotive along the track.

Figure 1:
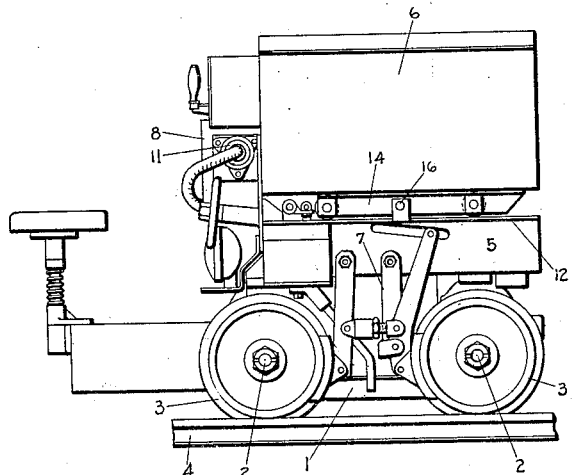
Figure 1 is a side elevation of an electric mine locomotive.

When the source of electric supply is supplied by storage battery units 6, it is common practice to recharge the batteries every twenty four hours, and it is desirable to provide a combined charging track and transfer table so arranged with respect to the track and charging apparatus, that the battery units can be expeditiously and conveniently unloaded from and loaded on to the transfer charging table or locomotive. The charging apparatus is illustrated more or less diagrammatically in the form of a well known charging panel 9 having associated therewith the usual adjuncts, such as a volt meter, ammeter, manual and automatic circuit breakers. The usual conductors from the charging panel to a battery unit are contained in a flexible cable 10 adapted to plug into a socket receptacle 11 forming standard equipment of storage battery units of this type for the insertion of an electrical conductor of the locomotive 5, which connects to the controller 8 in the well known manner. It will be observed that this socket receptacle 11 opens outwardly toward one side of the electric locomotive as clearly shown in Figs. 1 and 2.

The battery unit 6 is detachably mounted upon the supplemental frame 5 of the locomotive, said supplemental frame constituting a pair of tracks 12 for the support of the unit through the instrumentality of a plurality of rollers 13 carried by the bottom of each unit. In order to prevent accidental longitudinal movement of the unit on the tracks 12 of the locomotive frame, each unit is provided with a depending flange 14 provided with a transverse aperture 15 for the reception of a locking pin 16 slidable through a bracket carried by the locomotive frame when the apertures of the bracket and flange 14 are brought into registration.

In order to conveniently transfer battery units from the locomotive over to the remote charging instrumentality 9 and to return these units to the locomotive when fully charged, a charging and transfer table is located between the track of the locomotive and the charging instrumentality. In the arrangement shown in Figure 3, a pedestal 17 is positioned between the charging instrumentality and the locomotive tracks 4 directly in line with the longitudinal center line of the track 4. To the top of this pedestal is rigidly fixed a bearing casting 18 having a relatively broad base 19 and a cup-shaped vertically extending bearing 20. This bearing is also located on the longitudinal center line of the tracks 4. Supported in this bearing casting for pivotal movement through 360°, is a vertical trunnion 21 having a relatively broad flange or plate 22, upon which is supported by rigidly attaching thereto, the transfer charging table indicated in its entirety by the numeral 23.

Figure 5:
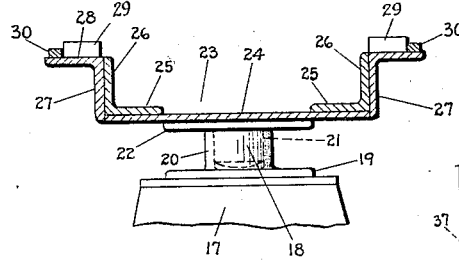
Figure 5 is a transverse sectional view taken along the line 5—5 of Figure 4.

This charging table is composed of a horizontal plate 24 bolted or otherwise rigidly secured to the flange 22, and it may or may not extend the entire length of the table 23 as judgment dictates. To opposite margins of this plate are rigidly secured horizontal flanges 25 of parallel angle beams. This disposition of the angle beams causes their arms 26 to be arranged vertically, and to the outer sides of these vertical arms are secured vertical arms 27 of a second pair of angle beams in a manner causing the other arms 28 thereof to be disposed horizontally and extended outwardly from the longitudinal center of the table to provide a pair of spaced parallel horizontal tracks. Secured to these tracks are abutment blocks 29 for engagement with the wheels 13 of the battery units to limit longitudinal travel of units inwardly toward the center of the table. The horizontal flanges 28 of the second pair of angle beams are disposed at the same elevation as the tracks 12 of the locomotive frame, in order that the battery units can be rolled on to the charging table from the locomotive or vice versa. In order to prevent the battery units from running off of the charging table, guide rails 30 are secured along the margins of the horizontal arms 28 as best seen in Figure 5. This prevents accidental lateral movement of the battery units relative to the charging table and in order to prevent these units from running off of the rails lengthwise, an aperture 31 is provided in the horizontal arm 28 at each end thereof for the reception of a removable chock or pin 32 carried by the chain 33 secured to the transfer table to prevent loss of these removable elements.

Figure 4:
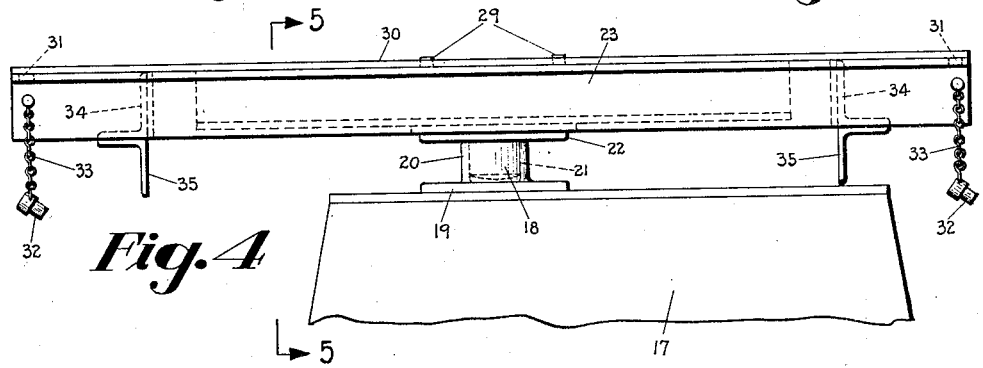
Figure 4 is an enlarged side elevation of the transfer and charging table.

The transfer table is rigidified transversely by connecting the outer ends of the angle beams 27 to the ends of transverse angle bars 34, to the under sides of which are secured angle cleats 35 with one leg thereof depending as shown in Figures 3 and 4. It will be noted that the axis of the transfer table is located eccentrically with respect to the pedestal 17 so that the depending legs of the cleats 35 will be in a position to engage the top of the pedestal to support the outer end of the transfer table when only one battery unit is disposed upon this end of the table causing the same to tilt slightly.

In operation, a locomotive having a discharged battery unit thereon is moved up to one end of the transfer table 23 and the latter is moved on its axis to cause its tracks 28 to align with the tracks 12 of the locomotive. The ends of the rails 28 are cut off at an angle, as shown at 36 to allow swinging movement of the table about its axis when the frame of the locomotive is arranged in close proximity thereto. With the removable chocks removed from the apertures 31 at the end of the table adjacent the locomotive, the lock 16 holding the battery unit on the locomotive is released and the electric cable connection with the socket 11 is disconnected from said socket. The battery unit 6 is then pushed toward the charging table to cause its rollers 13 to roll upon the tracks 28 of the charging table, after which the chocks 32 are replaced to prevent longitudinal movement of the battery unit in the direction of the locomotive. This battery unit is not moved beyond the center of the charging table, but is left standing upon the end thereof adjacent the locomotive, after which the transfer table is given one half of a revolution to transfer the battery unit from the locomotive, over to the charging instrumentality 9. This movement of the table and unit causes the latter to reverse its position so as to cause the opening in the conductor socket 11 to face in the direction opposite from its original position on the locomotive so as to be in proper position facing the charging panel for the ready insertion of the conductor cable 10 into the socket 11. The unit is left standing upon this table in this position during the charging interval and when the charging operation has been completed, a locomotive with another battery unit to be charged can be rolled up to the end of the charging table so that a discharged unit can be rolled on to the vacant end of the table, as shown in Figure 3. Then, to place the fully charged battery unit upon the locomotive and to simultaneously transfer the discharged battery to a point adjacent the charging panel, the conductor 10 is disconnected from the socket 11, after which the table is given another one-half revolution in a clockwise direction to cause the conductor socket 11 of the discharged unit to face the charging panel and the opening of the socket 11 in the charged unit to face in proper position so that the chock 32 can be removed and the charged unit rolled on to the waiting locomotive track 12 to be electrically and mechanically connected thereto in the manner heretofore described. During this one-half revolution of the table, it will be observed that the discharged unit is moved over to the charging panel and its position is reversed so that the plug socket faces the panel in proper position to be electrically coupled therewith.

Figure 7:
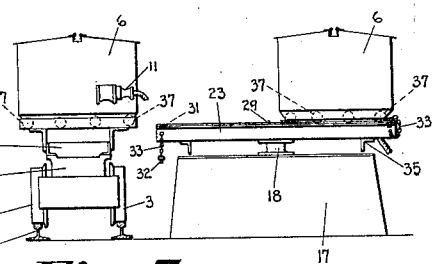
Figure 7 is a side elevation of a modified arrangement of the apparatus disclosed in Figure 3.

In the modification shown in Figure 7, the pedestal 17 is located laterally of the locomotive tracks 4 instead of in longitudinal alignment therewith as in the preceding form, and the transfer table 23 is spaced a slight distance from the side of the locomotive. Also, the battery units 6 are movable transversely of the locomotive instead of longitudinally thereof, and are provided with a larger number of rollers 37 than required in the preceding modification on account of the space between the locomotive and the transfer table to overcome tipping or tilting of the battery units. Otherwise then, the construction, arrangement and details are the same as in the preceding modification.

It is to be understood that various changes in the arrangement and construction of parts may be resorted to without departing from the scope of the appended claims.

I claim:

1. In a system of battery charging, a loading and unloading station, a charging device situated remotely therefrom, and a transfer device for holding a plurality of battery units, said transfer device being operable to simultaneously move battery units toward said station and charging device.

2. In a system of battery charging, a loading and unloading station, a charging device situated remotely therefrom, and a rotatable transfer device for moving a plurality of battery units between said station and charging device.

3. In a system of battery charging, a loading and unloading station, a charging device situated remotely therefrom, and a transfer device for holding a plurality of battery units, said transfer device being operable to position the battery units for proper connection to the charging device and locomotive.

4. In a system of battery charging, a loading and unloading station, a charging device situated remotely therefrom, and a transfer device for moving battery units and for reversing the position of said units in moving them to and from the charging device.

5. The method of handling storage battery units consisting of placing a unit in a predetermined position on a transfer device, and then moving the transfer device to position the unit in cooperative relation to a charging device and simultaneously to a position whereby the transfer device can receive another battery unit.

6. The method of handling storage battery units consisting of placing a unit in a predetermined position on a transfer device, then moving the transfer device to position the unit in cooperative relation to a charging device and simultaneously to a position whereby the transfer device can receive another battery unit, placing another unit on the transfer device, and then moving said transfer device to move said first unit into the same relative position in which it was placed on the transfer device simultaneously with the movement of the second unit into the position occupied by the first unit.

7. The combination of an electric locomotive having a track thereon, a removable battery unit movable on said track, a transfer device movable on an axis and having a track to receive said unit from the locomotive, and means for preventing movement of the unit radially of said transfer device when positioned thereon and the device is turned about its axis.

8. The combination of an electric locomotive having a track thereon, a removable battery unit movable on said track, a transfer device movable on an axis and having a track to receive said unit from the locomotive, and a removable abutment adapted to be arranged in the path of movement of said unit to prevent movement of the latter radially of the transfer device when positioned thereon and the device is turned about its axis.

9. A transfer device comprising a center plate rotatable about an axis, a pair of parallel angle beams secured thereto with one flange arranged perpendicular, and a second pair of angle beams having one flange secured to said perpendicular flanges and their other flanges disposed horizontally to provide a pair of spaced tracks.

10. A transfer device comprising a center plate rotatable about an axis, a pair of parallel angle beams secured thereto with one flange arranged perpendicular, a second pair of angle beams having one flange secured to said perpendicular flanges and their other flanges disposed horizontally to provide a pair of spaced tracks, and guide rails secured along the margins of said horizontal flanges.

11. The combination with a support, a rotatable transfer table mounted eccentrically thereof, said table comprising a pair of angle beams, transverse angle bars connecting said beams at their outer ends, and supporting legs secured to said angle bars and adapted for engagement with said support to prevent tilting of the table.

12. A transfer device for battery units comprising a turntable having a diametrically disposed track of such length to accommodate a pair of battery units in tandem, and means adjacent the axis of said turntable for preventing movement of the units across said axis.

13. A transfer device for battery units comprising a turntable having a diametrically disposed track of such length to accommodate a pair of battery units in tandem, and stop means on said track adjacent the axis of said turntable for preventing movement of the units across said axis.

14. A transfer device for battery units comprising a turntable having a track of such length to accommodate a pair of battery units arranged end to end, and means at opposite ends of said track engageable with the ends of said units to prevent their displacement from the track upon rotation of the turntable.

15. In a transfer device for battery units, the combination with a turntable; of a battery unit having terminal connections disposed at one end thereof and accessible at one side of the unit, said unit adapted to be arranged upon the turntable at one side of its axis with the terminal connections accessible at one side of the turntable, and said turntable being rotatable to reverse the position of the unit to dispose the terminal connections at the opposite side of the turntable.

16. In a transfer device for battery units, the combination with a turntable having a diametrically disposed track; of a pair of battery units adapted to be disposed upon said track in tandem and upon opposite sides of the axis of the turntable, and each of said units having terminal connections at one end thereof, the connections of one unit being accessible from one side of the turntable and the connections of the other unit being accessible from the opposite side of the turntable.

17. The combination with a vehicle having a track; of a turntable having a track adapted to align with the vehicle track and arranged at approximately the same elevation thereof, and the ends of the turntable track terminating in oblique edges to be disposed in close proximity to the vehicle track and to permit movement of the turntable track about its axis relative to said vehicle track.

18. The combination with a battery loading and unloading station and battery charging means spaced from said station, of a turntable rotatable about a vertical axis and disposed between the station and charging means, said turntable being adapted to support a plurality of batteries in tandem relation.

19. The combination with a battery loading and unloading station and battery charging means spaced from said station, of a turntable rotatable about a vertical axis and disposed between the station and charging means, said turntable being adapted to support a plurality of batteries in tandem relation and in substantially symmetrical relation to the turntable axis.

20. The combination with a battery loading and unloading station and battery charging means spaced from said station, of a turntable rotatable about a vertical axis and disposed between the station and charging means, and a guideway on said turntable of a length to receive a plurality of batteries and to extend substantially the distance between the station and charging means.

21. The combination with a battery loading and unloading station and battery charging means spaced from said station, of a turntable rotatable about a vertical axis and disposed between the station and charging means, and a guideway on said turntable of a length to receive a plurality of batteries in symmetrical relation to the turntable axis and to extend substantially the distance between the station and charging means.

22. The combination with an electric locomotive, of a track thereon, a removable battery unit movable along said track onto and off said electric locomotive, a transfer device having a track to receive said battery unit from said electric locomotive, and a removable abutment adapted to be arranged in the path of movement of said battery unit to prevent movement of the latter off said track when positioned thereon.

23. The combination with a pedestal support, of a transfer device on top of said pedestal support toward one side thereof, and means on the bottom of said transfer device and spaced from the axis thereof to prevent undue tilting of the transfer device when an unbalanced load is on that end of the transfer device above the pedestal support.

24. The combination with a pedestal support, of a transfer track pivotally mounted on the top thereof, and means on the bottom of said transfer device spaced from the axis thereof to prevent undue tilting of the transfer device when an unbalanced load is located thereon.

25. A transfer device comprising a center plate, a pair of parallel angle beams secured to said plate with one flange perpendicular, and a second pair of angle beams each having one flange secured to one of said perpendicular flanges with the other flanges of said second pair of angle beams disposed horizontally to provide a pair of spaced tracks.

26. A transfer device comprising a center plate, a pair of parallel angle beams secured thereto at the edges thereof, a second pair of angle beams each having one flange secured to a perpendicular flange of said first-named angle beams, the other flanges of said second pair of angle beams being disposed horizontally to provide a pair of spaced-apart tracks, and guides extending along the outer margins of said horizontal flanges.

27. A transfer device comprising a center plate, a pair of parallel angle beams secured to the opposite margins of said center plate, a second pair of angle beams secured to the first-named pair of angle beams, and transverse angle bars connecting the outer end portions of said second pair of angle beams.

28. The combination with a pedestal support, of a rotatable transfer table mounted eccentrically thereon, and supporting legs depending from the bottom of said transfer table in position to engage the top of said pedestal support to limit the tilting thereof when an unbalanced load is located thereon above said pedestal support.

In testimony whereof I have hereunto set my hand.

GEORGE O. ELLSTROM.